(12) United States Patent
Yang et al.

(10) Patent No.: US 12,494,236 B2
(45) Date of Patent: Dec. 9, 2025

(54) MEMORY DEVICE AND SYSTEM DEVICE INCLUDING THE SAME

(71) Applicant: Samsung Electronics Co., Ltd., Suwon-si (KR)

(72) Inventors: Yunseok Yang, Suwon-si (KR); Eungchang Lee, Suwon-si (KR); Seula Ryu, Suwon-si (KR); Minhwan An, Suwon-si (KR); Yunkyeong Jeong, Suwon-si (KR); Chul-Hwan Choo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 18/354,869

(22) Filed: Jul. 19, 2023

(65) Prior Publication Data
US 2024/0177749 A1    May 30, 2024

(30) Foreign Application Priority Data

Nov. 24, 2022    (KR) .................... 10-2022-0159271

(51) Int. Cl.
  *G11C 8/12* (2006.01)
  *G11C 5/06* (2006.01)
  *G11C 7/10* (2006.01)

(52) U.S. Cl.
CPC .............. *G11C 7/1084* (2013.01); *G11C 5/06* (2013.01); *G11C 7/1057* (2013.01)

(58) Field of Classification Search
CPC ....... G11C 7/1084; G11C 5/06; G11C 7/1057; G11C 7/1012; G11C 8/12; G11C 5/04; G11C 5/025; G11C 5/063; G11C 5/14; G11C 8/06; H10B 80/00; H01L 23/48; H01L 24/15; H01L 25/0657; H01L 2225/06541

(Continued)

(56) References Cited

U.S. PATENT DOCUMENTS 7,999,367 B2    8/2011    Kang et al.
8,178,964 B2    5/2012    Yang (Continued)

FOREIGN PATENT DOCUMENTS

KR    20190107550 A    9/2019

OTHER PUBLICATIONS

"Chip-on-Wafer-on-Substrate (CoWoS)" Retrieved from https:// https://en.wikichip.org/wiki/tsmc/cowos (Retrieved on Mar. 24, 2023).

(Continued)

*Primary Examiner* — Huan Hoang
(74) *Attorney, Agent, or Firm* — Wolf, Greenfield & Sacks, P.C.

(57) ABSTRACT

A memory device includes a base die that includes a data signal bump configured to receive a data signal, a first memory stack that includes first memory dies sequentially stacked on the base die, and a second memory stack that includes second memory dies sequentially stacked on the base die and spaced from the first memory stack in a direction parallel to an upper surface of the base die. The base die is configured to selectively provide the data signal received through the data signal bump to one of the first memory stack or the second memory stack based on a selection signal.

20 Claims, 17 Drawing Sheets

(58) Field of Classification Search
USPC .................................................. 365/189.05
See application file for complete search history.

(56) References Cited

U.S. PATENT DOCUMENTS

| | | | |
|---|---|---|---|
| 8,737,106 B2 | 5/2014 | Best et al. | |
| 8,947,931 B1* | 2/2015 | D'Abreu | H01L 25/0652 |
| | | | 365/185.11 |
| 9,106,229 B1 | 8/2015 | Hutton et al. | |
| 9,443,824 B1 | 9/2016 | We et al. | |
| 9,484,326 B2 | 11/2016 | Keeth et al. | |
| 9,847,320 B2 | 12/2017 | Chen et al. | |
| 10,002,835 B2 | 6/2018 | Fasano et al. | |
| 10,068,852 B2 | 9/2018 | Mahajan et al. | |
| 10,461,036 B2 | 10/2019 | Yu et al. | |
| 10,535,608 B1 | 1/2020 | Rubin et al. | |
| 10,727,185 B2 | 7/2020 | Aleksov et al. | |
| 10,943,869 B2 | 3/2021 | Zhai et al. | |
| 10,985,126 B2 | 4/2021 | Shim et al. | |
| 11,133,266 B2 | 9/2021 | Ding et al. | |
| 11,245,399 B1* | 2/2022 | Seong | H03K 3/356182 |
| 11,289,424 B2 | 3/2022 | Wu et al. | |
| 11,334,282 B2 | 5/2022 | Lee et al. | |
| 11,704,211 B1* | 7/2023 | Kaplan | G06F 11/1666 |
| | | | 714/6.13 |
| 2019/0259743 A1* | 8/2019 | Han | H01L 25/0657 |
| 2021/0375823 A1 | 12/2021 | Hwang et al. | |
| 2022/0157728 A1 | 5/2022 | Kirby | |
| 2022/0300426 A1 | 9/2022 | Malladi et al. | |

OTHER PUBLICATIONS

"DNP Develops Interposer, a Primary Component in Next-Generation Semiconductor Packaging" Retrieved from https://www.global.dnp/news/detail/20167149_4126.html (Dec. 7, 2021).

Lin et al. "Multilayer RDL Interposer for Heterogeneous Device and Module Integration" 2019 IEEE 69th Electronic Components and Technology Conference (pp. 931-936) (May 2019).

* cited by examiner

MEMORY DEVICE AND SYSTEM DEVICE INCLUDING THE SAME

CROSS-REFERENCE TO RELATED APPLICATIONS

This application claims priority under 35 U.S.C. § 119 to Korean Patent Application No. 10-2022-0159271 filed on Nov. 24, 2022, in the Korean Intellectual Property Office, the disclosure of which is incorporated by reference herein in its entirety.

Embodiments of the present disclosure relate to a semiconductor device, and more particularly, relate to a memory device and a system device including the same.

BACKGROUND

A high-bandwidth memory device may have a structure in which a plurality of memory dies and a base die (which may be referred to as a "buffer die") are stacked. The plurality of memory dies may be stacked on the base die. The plurality of memory dies may receive a command and an address from the base die by using through silicon vias (TSV) penetrating the plurality of memory dies and may exchange the data with the base die therethrough.

A system device may include a high-bandwidth memory device and a control device (e.g., a graphic processing unit (GPU) die, a central processing unit (CPU) die, or a system on chip (SoC)). The base die of the high-bandwidth memory device may receive a command and an address transmitted from the control device and may exchange the data with the control device.

SUMMARY

Embodiments of the present disclosure provide a memory device whose electrical characteristics are improved.

According to an embodiment, a memory device includes a base die that includes a data signal bump configured to receive a data signal, a first memory stack that includes first memory dies sequentially stacked on the base die, and a second memory stack that includes second memory dies sequentially stacked on the base die and spaced from the first memory stack in a direction parallel to an upper surface of the base die, and the base die is configured to selectively provide the data signal received through the data signal bump to one of the first memory stack or the second memory stack based on a selection signal.

According to an embodiment, a memory device includes a base die that includes a data signal bump configured to receive a data signal, a first memory stack that includes first memory dies sequentially stacked on the base die, and a second memory stack that includes second memory dies sequentially stacked on the base die and spaced from the first memory stack in a direction parallel to an upper surface of the base die, and the base die is configured to provide the data signal received through the data signal bump to at least one of the first memory dies and at least one of the second memory dies based on at least one selection signal.

According to an embodiment, a system device includes an interposer, a memory device that is on the interposer, and a control device that is on the interposer and is configured to generate a data signal including data information. The memory device includes a base die that includes a data signal bump configured to receive the data signal from the control device through the interposer, a first memory stack that includes first memory dies sequentially stacked on the base die, and a second memory stack that includes second memory dies sequentially stacked on the base die and spaced from the first memory stack in a direction parallel to an upper surface of the base die, and the base die is configured to selectively provide the data signal received through the data signal bump to one of the first memory stack or the second memory stack based on a selection signal.

BRIEF DESCRIPTION OF THE FIGURES

The above and other objects and features of the present disclosure will become apparent by describing in detail embodiments thereof with reference to the accompanying drawings.

DETAILED DESCRIPTION OF EMBODIMENTS

Below, embodiments of the present disclosure are described with detail and clarity to such an extent that one skilled in the art can implement the present disclosure. The terms "comprises," "comprising," "includes" and/or "including," when used herein, specify the presence of stated elements, but do not preclude the presence of additional elements. The term "and/or" includes any and all combinations of one or more of the associated listed items.

Figure 1:
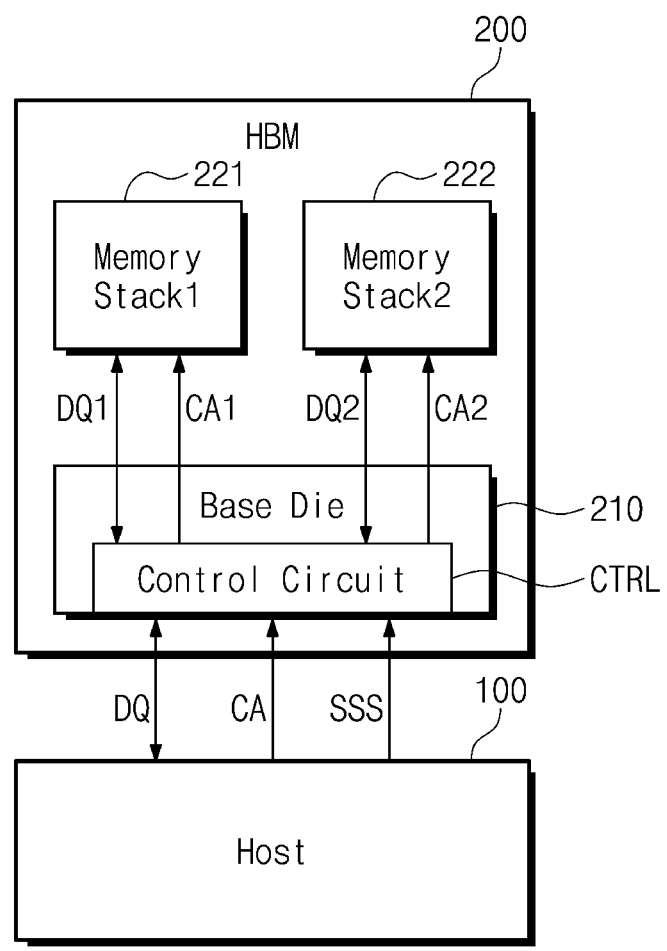
FIG. 1 is a block diagram illustrating a memory system according to an embodiment of the present disclosure.

FIG. 1 is a block diagram illustrating a memory system according to an embodiment of the present disclosure.

Referring to FIG. 1, a memory system 10 may include a host 100 and a high-bandwidth memory device 200.

The host 100 may be configured to generate various kinds of signals for controlling a memory operation of the high-bandwidth memory device 200, such as a read operation or a write operation. For example, the host 100 may be configured to generate a command address signal CA including various kinds of command information and address information (hereinafter referred to as "command address information") for accessing the high-bandwidth memory device 200, a data signal DQ including data information to be written in the high-bandwidth memory device 200, and a stack selection signal SSS for selecting a memory stack to be accessed. Also, the host 100 may be configured to receive the data signal DQ including readout data information.

The host 100 may include a graphic processing unit (GPU), a central processing unit (CPU), or a system on chip (SoC).

The high-bandwidth memory device 200 may include a base die (or logic die or buffer die) 210, a first memory stack 221, and a second memory stack 222. The terms "first," "second," etc., may be used herein merely to distinguish one element, component, layer, etc., from another.

The base die 210 may be configured to receive various kinds of signals from the host 100 and to perform or provide the access to the first memory stack 221 and the second memory stack 222. For example, the base die 210 may include a control circuit CTRL. The control circuit CTRL may be configured to receive the command address signal CA from the host 100. The control circuit CTRL may be configured to provide a first command address CA1 and a second command address CA2, which include command address information, to the first memory stack 221 and the second memory stack 222, respectively, based on the command address signal CA.

The control circuit CTRL may be configured to receive the data signal DQ. The control circuit CTRL may be configured to provide the first memory stack 221 or the second memory stack 222 with first data DQ1 or second data DQ2, which include data information to be written in the first memory stack 221 or the second memory stack 222, respectively, based on the data signal DQ. Also, the control circuit CTRL may be configured to generate the data signal DQ based on the first data DQ1 or the second data DQ2 read from the first memory stack 221 or the second memory stack 222.

The control circuit CTRL may be configured to receive the stack selection signal SSS. The control circuit CTRL may be configured to provide the first data DQ1 to the first memory stack 221 or to provide the second data DQ2 to the second memory stack 222, based on the stack selection signal SSS. Also, the control circuit CTRL may be configured to read the first data DQ1 from the first memory stack 221 or to read the second data DQ2 from the second memory stack 222, based on the stack selection signal SSS.

The base die 210 may include under bumps for receiving various kinds of signals from the host 100. The under bumps may include data signal bumps for exchanging the data signal DQ with the host 100, command address bumps for receiving the command address signal CA from the host 100, and control signal bumps for receiving the stack selection signal SSS.

According to an embodiment of the present disclosure, the first memory stack 221 and the second memory stack 222 of the high-bandwidth memory device 200 may be configured to perform the memory operation based on the data signal DQ received through the same data signal bumps. In other words, the first memory stack 221 and the second memory stack 222 may share the data signal bumps for receiving the data signal DQ.

Figure 2:
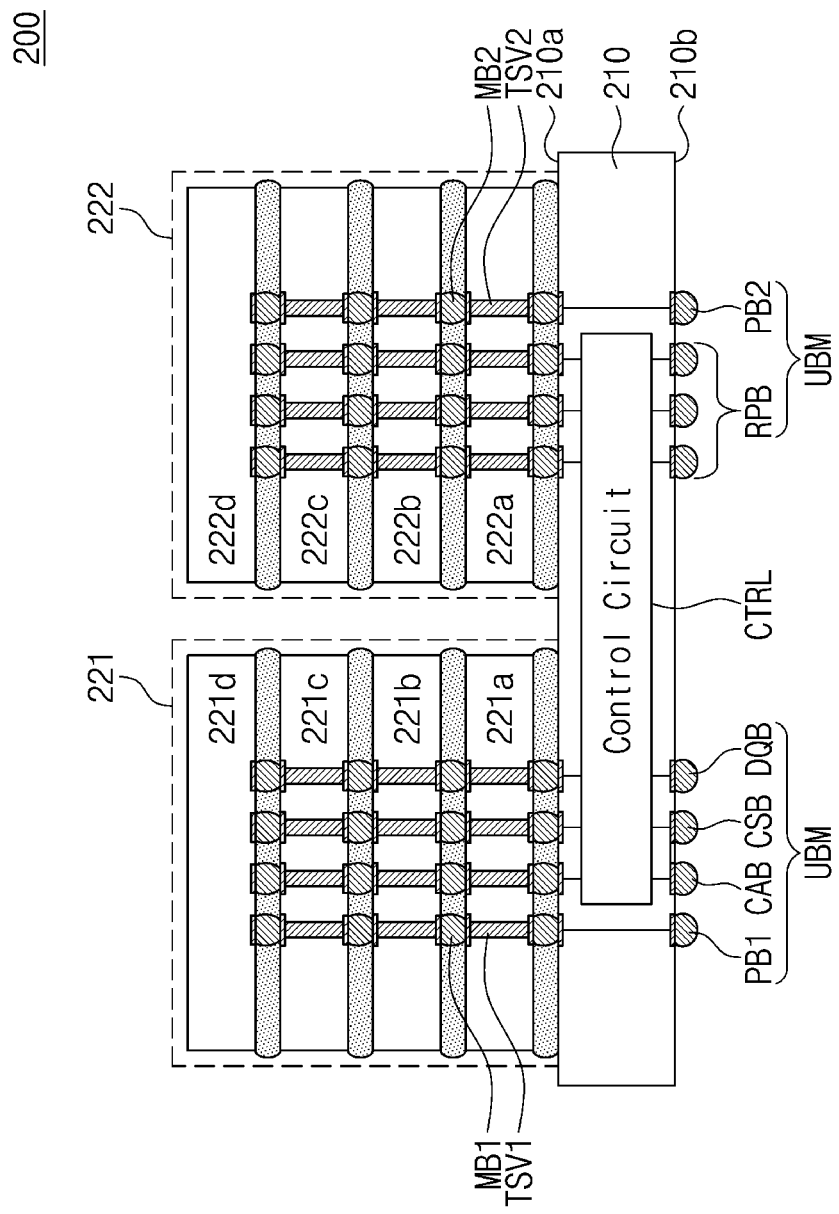
FIG. 2 is a diagram illustrating an embodiment of a high-bandwidth memory device of FIG. 1.

FIG. 2 is a diagram illustrating an embodiment of a high-bandwidth memory device of FIG. 1.

Referring to FIG. 2, the high-bandwidth memory device 200 may include the first memory stack 221, the second memory stack 222, and the base die 210.

Each of the first and second memory stacks 221 and 222 may include a plurality of memory dies. The first memory stack 221 may include first memory dies 221a to 221d sequentially stacked on the upper surface of the base die 210, and the second memory stack 222 may include second memory dies 222a to 222d sequentially stacked on the upper surface of the base die 210. Sequentially stacked elements as described herein may be stacked on one another in any order or sequence.

Each of the first memory dies 221a to 221d of the first memory stack 221 may include first terminals MB1, and each of the second memory dies 222a to 222d of the second memory stack 222 may include second terminals MB2. The first terminals MB1 and the second terminals MB2 may be micro bumps.

The first terminals MB1 may include first data terminals for exchanging the first data DQ1 with the first memory dies 221a to 221d and first command address terminals for receiving the first command address CA1 for the purpose of performing the access to the first memory dies 221a to 221d. The second terminals MB2 may include second data terminals for exchanging the second data DQ2 with the second memory dies 222a to 222d and second command address terminals for receiving the second command address CA2 for the purpose of performing the access to the second memory dies 222a to 222d.

The first memory stack 221 and the second memory stack 222 may exchange the data with the base die 210 through the first data terminals and the second data terminals.

The first memory stack 221 and the second memory stack 222 may receive the command address information from the base die 210 through the first command address terminals and the second command address terminals.

First through silicon vias TSV1 penetrating the first memory dies 221a to 221d may be provided between the first terminals MB1 of the first memory stack 221. Second through silicon vias TSV2 penetrating the second memory dies 222a to 222d may be provided between the second terminals MB2 of the second memory stack 222.

The first memory stack 221 and the second memory stack 222 may be disposed to be spaced from each other in a direction parallel to an upper surface 210a of the base die 210. The first memory stack 221 and the second memory stack 222 may be provided on one base die 210. In other words, the first memory stack 221 and the second memory stack 222 may be configured to share the same base die 210.

The base die 210 may include the upper surface 210a on which the first memory stack 221 and the second memory stack 222 are provided and a lower surface 210b on which under bumps UBM for receiving various kinds of signals from the host 100 and transmitting the data signal DQ thereto.

The under bumps UBM provided on the lower surface 210b of the base die 210 may include power supply bumps PB1 and PB2, command address bumps CAB, data signal bumps DQB, residual bumps RPB, and control signal bumps CSB. The under bumps UBM may be micro bumps.

The power supply bumps PB1 and PB2 may be bumps through which a power signal is received. Power may be supplied to the first memory stack 221, the second memory stack 222, and the control circuit CTRL of the base die 210 by the power signal received through the power supply bumps PB1 and PB2.

The power supply bumps PB1 and PB2 may include the first power supply bump PB1 for supplying power to the first memory stack 221 and the second power supply bump PB2 for supplying power to the second memory stack 222.

The command address bumps CAB may be bumps through which the command address signal CA is received from the host 100. According to an embodiment of the present disclosure, the first memory stack 221 and the second memory stack 222 may share the command address bumps CAB through which the command address signal CA is received. As the command address signal CA is input to the command address bumps CAB, the command address information may be provided to the control circuit CTRL.

The data signal bumps DQB may be bumps for transmitting the data signal DQ to the host 100. According to an embodiment of the present disclosure, the first memory stack 221 and the second memory stack 222 may share the data signal bumps DQB through which the data signal DQ is transmitted. According to the above description, the spare residual bumps RPB may be secured compared to the case where each of the first memory stack 221 and the second memory stack 222 transmits data through separate data signal bumps.

Some (hereinafter referred to as "first residual bumps") of the residual bumps RPB may be bumps through which a power signal is received. Power may be supplied to the control circuit CTRL of the base die 210, the first memory stack 221, and the second memory stack 222 by the power signal received through the first residual bumps.

The others (hereinafter referred to as "second residual bumps") of the residual bumps RPB may be bumps through which signals are not received. For example, the second residual bumps RPB may be bumps that are provided to improve the adhesion between the base die 210 and an external substrate (e.g., an interposer) adhered to the base die 210. In other words, a subset including one or more of the residual bumps may be non-functional for signal transmission.

The control signal bumps CSB may be bumps for receiving signals for controlling the control circuit CTRL of the base die 210. For example, the stack selection signal SSS may be received from the host 100 through the control signal bumps CSB.

The base die 210 may include the control circuit CTRL configured to selectively provide data information received through the data signal bumps DQB (e.g., based on a selection signal, such as the stack selection signal SSS and/or die selection signal DSS described herein) to one of the first memory stack 221 and the second memory stack 222. The control circuit CTRL may include an integrated circuit including electronic elements such as a transistor, a latch, and a flip-flop.

Figure 3:
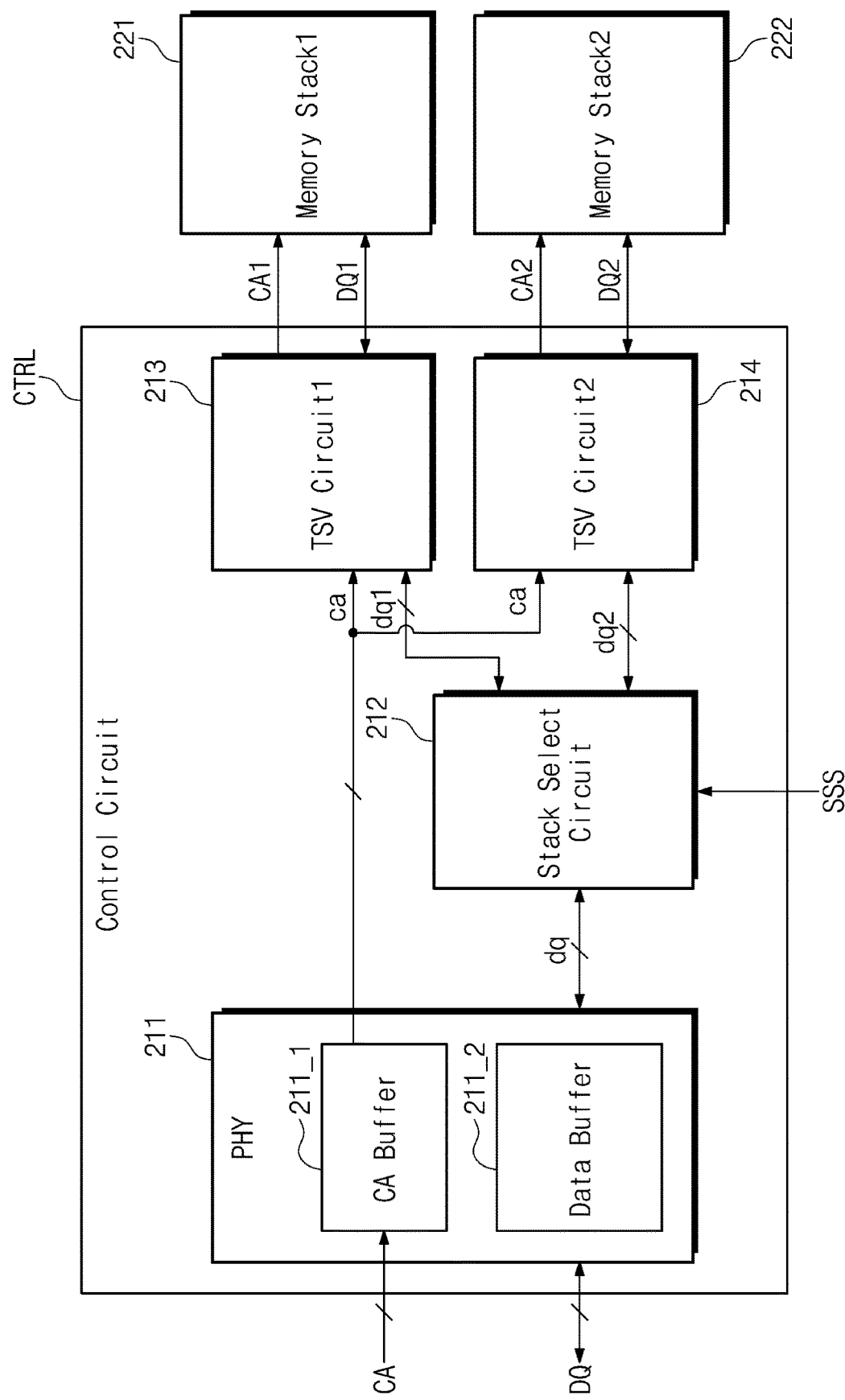
FIG. 3 is a block diagram illustrating components of a control circuit of a base die of FIG. 1.

FIG. 3 is a block diagram illustrating components of the control circuit CTRL of the base die 210 of FIG. 1.

Referring to FIG. 3, the control circuit CTRL may include a physical layer 211, a stack select circuit 212, a first TSV circuit 213, and a second TSV circuit 214.

The physical layer 211 may include a command address buffer 211_1 and a data buffer 211_2. The physical layer 211 may be configured to store command address information ca and data information dq based on the command address signal CA and the data signal DQ received from the host 100.

The command address buffer 211_1 may be configured to store the command address information ca based on the command address signal CA received through the command address bumps CAB of FIG. 2. The command address buffer 211_1 may be configured to provide the stored command address information ca to the first TSV circuit 213 and the second TSV circuit 214.

The data buffer 211_2 may be configured to store the data information dq based on the data signal DQ received through the data signal bumps DQB of FIG. 2. The data buffer 211_2 may be configured to provide the stored data information dq to the stack select circuit 212.

The data buffer 211_2 may be configured to store the data information dq received from the stack select circuit 212. The data buffer 211_2 may be configured to provide the data signal DQ including the data information DQ to the host 100 through the data signal bumps DQB.

The stack select circuit 212 may be configured to select one of the first memory stack 221 and the second memory stack 222 based on the stack selection signal SSS such that data information dq1 and dq2 are output to a TSV circuit connected to the selected memory stack. The term "connected" may be used herein to refer to a physical and/or electrical connection.

The stack select circuit 212 may be configured to selectively connect an output terminal of the data buffer 211_2 with either a data input terminal of the first TSV circuit 213 or a data input terminal of the second TSV circuit 214 based on the stack selection signal SSS. A configuration and an operation of the stack select circuit 212 will be described in detail with reference to FIGS. 4 to 6.

The first TSV circuit 213 may be electrically connected to the first memory stack 221. The stack select circuit 212 may provide the data information dq1 to the first memory stack 221 through the first TSV circuit 213.

The first TSV circuit 213 may include a command address input terminal for receiving the command address information ca from the physical layer 211. The first TSV circuit 213 may be configured to provide the first command address CA1 to the first memory stack 221 based on the received command address information ca.

The first TSV circuit 213 may include a data input terminal for receiving the data information dq1 from the stack select circuit 212. The first TSV circuit 213 may be configured to provide the first data DQ1 to the first memory stack 221 based on the received data information dq1.

When the read operation is performed, the first TSV circuit 213 may be configured to receive the first data DQ1 from the first memory stack 221 and to provide the data information dq1 to the stack select circuit 212.

The second TSV circuit 214 may include a command address input terminal for receiving the command address information ca from the physical layer 211. The second TSV circuit 214 may be configured to provide the second command address CA2 to the second memory stack 222 based on the received command address information ca.

The second TSV circuit 214 may include a data input terminal for receiving the data information dq2 from the stack select circuit 212. The second TSV circuit 214 may be configured to provide the second data DQ2 to the second memory stack 222 based on the received data information dq2.

When the read operation is performed, the second TSV circuit 214 may be configured to receive the second data DQ2 from the second memory stack 222 and to provide the data information dq2 to the stack select circuit 212.

Figure 4:
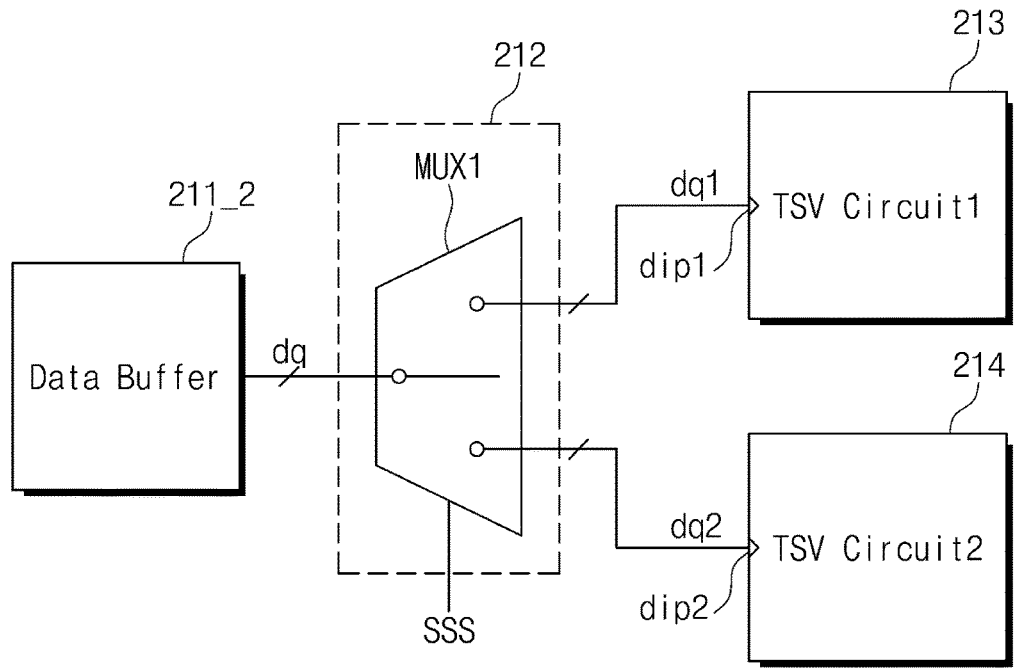
FIG. 4 is a diagram illustrating an example of a stack select circuit of FIG. 3.
Figure 5:
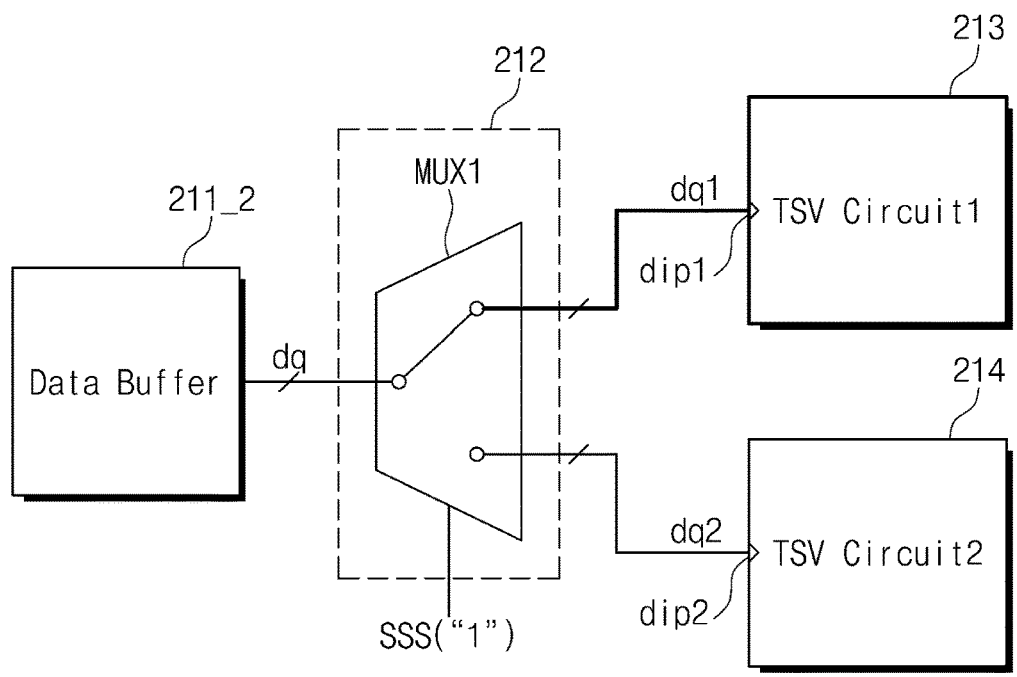
FIGS. 5 and 6 are diagrams for describing an operation of a stack select circuit of FIG. 4.
Figure 6:
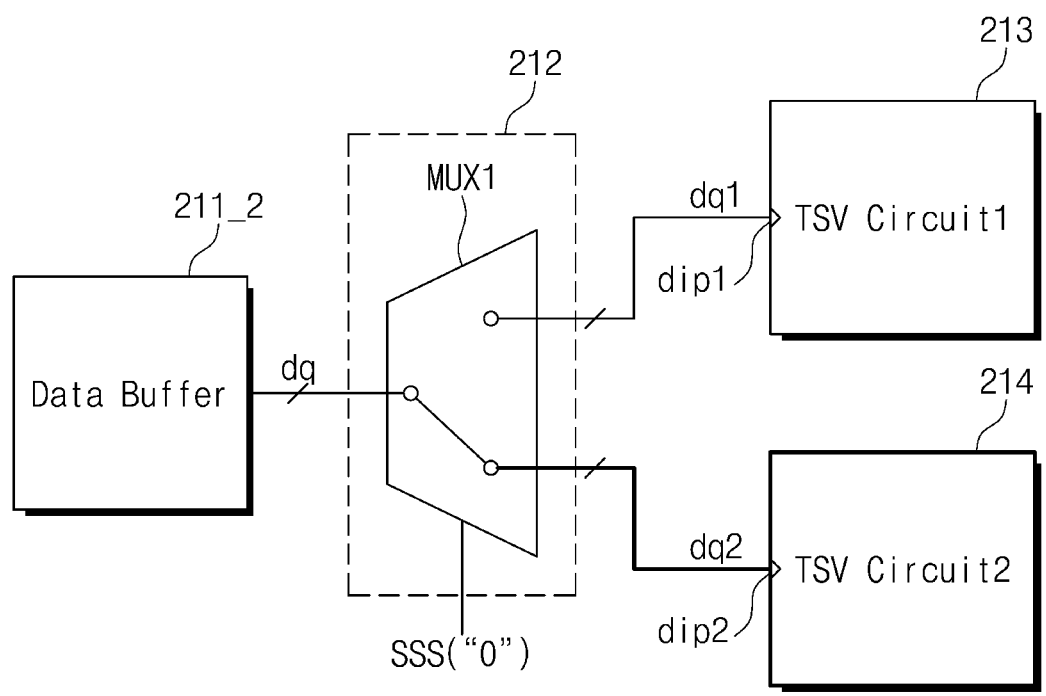

FIG. 4 is a diagram illustrating an example of a stack select circuit of FIG. 3. FIGS. 5 and 6 are diagrams for describing an operation of a stack select circuit of FIG. 4. Below, an example of a stack select circuit of FIG. 3 will be described in detail with reference to FIGS. 4 to 6.

Referring to FIG. 4, the stack select circuit 212 may include a first select circuit MUX1.

The first select circuit MUX1 may be configured to receive the stack selection signal SSS. The first select circuit MUX1 may be configured to selectively connect the output terminal of the data buffer 211_2 to a data input terminal dip1 of the first TSV circuit 213 or a data input terminal dip2 of the second TSV circuit 214 based on the stack selection signal SSS.

Referring to FIG. 5, when the stack selection signal SSS is in a first logic state (e.g., a logic "1" state), the first select circuit MUX1 may be configured to electrically connect the output terminal of the data buffer 211_2 and the data input terminal dip1 of the first TSV circuit 213. When the stack selection signal SSS is in the first logic state, the data information dq1 stored in the data buffer 211_2 may be output to the first TSV circuit 213, or the data information dq1 received from the first TSV circuit 213 may be stored in the data buffer 211_2.

Referring to FIG. 6, when the stack selection signal SSS is in a second logic state (e.g., a logic "0" state), the first select circuit MUX1 may be configured to electrically connect the output terminal of the data buffer 211_2 and the data input terminal dip2 of the second TSV circuit 214. When the stack selection signal SSS is in the second logic state, the data information dq2 stored in the data buffer 211_2 may be output to the second TSV circuit 214, or the data information dq2 received from the second TSV circuit 214 may be stored in the data buffer 211_2.

According to an embodiment of the present disclosure, the data information dq that is input to/output from the first memory stack 221 and the second memory stack 222 may be transferred through the same common data signal bumps DQB provided on the lower surface 210b of the base die 210. For example, the data signal bumps DQB may be shared by the first memory stack 221 and the second memory stack 222 by using the selection circuits described herein to implement a multiplexed or other shared access scheme. According to an embodiment of the present disclosure, it may be possible to secure or reallocate the spare residual bumps RPB compared to the case where the first memory stack 221 and the second memory stack 222 transmit data through independent data signal bumps; in this case, the power characteristic of the high-bandwidth memory device 200 may be improved by providing the power to the spare residual bumps RPB.

Figure 7:
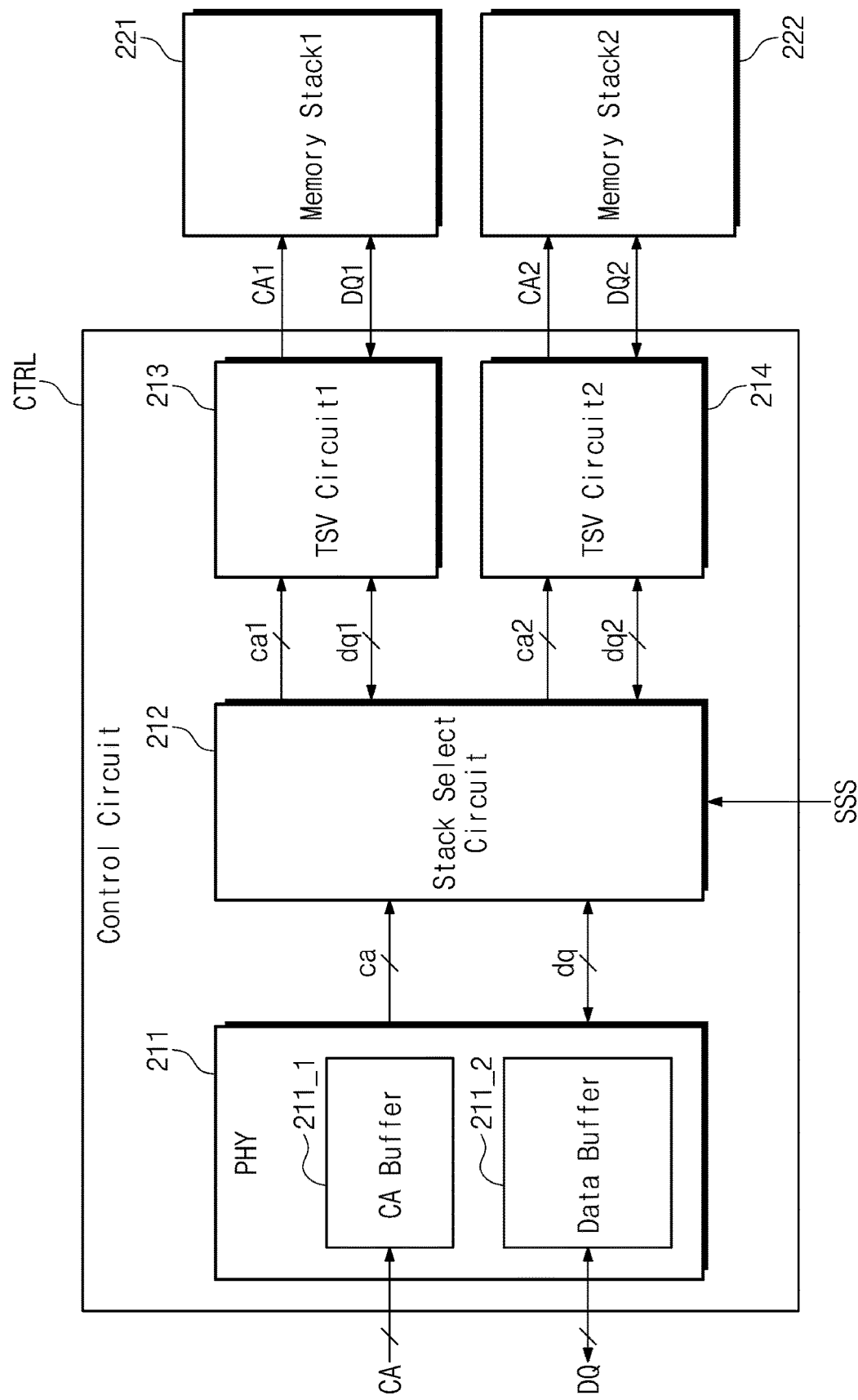
FIG. 7 is a block diagram illustrating components of a control circuit of a base die of FIG. 1.

FIG. 7 is a block diagram illustrating components of the control circuit CTRL of the base die 210 of FIG. 1. Below, the description that is the same as the description given with reference to the embodiment of FIGS. 1 to 6 will be omitted, and the description will be given based on a difference between embodiments.

Referring to FIG. 7, the control circuit CTRL may include the physical layer 211, the stack select circuit 212, the first TSV circuit 213, and the second TSV circuit 214.

The physical layer 211 may include the command address buffer 211_1 and the data buffer 211_2. The physical layer 211 may be configured to store the command address information ca and the data information dq based on the command address signal CA and the data signal DQ received from the host 100.

The command address buffer 211_1 may be configured to store the command address information ca based on the command address signal CA received through the command address bumps CAB of FIG. 2. The command address buffer 211_1 may be configured to provide the stored command address information ca to the stack select circuit 212.

The data buffer 211_2 may be configured to store the data information dq based on the data signal DQ received through the data signal bumps DQB of FIG. 2. The data buffer 211_2 may be configured to provide the stored data information dq to the stack select circuit 212.

The data buffer 211_2 may be configured to store the data information dq received from the stack select circuit 212. The data buffer 211_2 may be configured to provide the data signal DQ including the data information DQ to the host 100 through the data signal bumps DQB.

The stack select circuit 212 may be configured to select one of the first memory stack 221 and the second memory stack 222 based on the stack selection signal SSS such that the data information dq1 and dq2 and command address information ca1 and ca2 are output to a TSV circuit connected to the selected memory stack.

A configuration and an operation of the stack select circuit 212 will be described in detail with reference to FIGS. 8 to 10.

The first TSV circuit 213 may be electrically connected to the first memory stack 221. The stack select circuit 212 may provide the data information dq1 and the command address information ca1 to the first memory stack 221 through the first TSV circuit 213.

The first TSV circuit 213 may include a command address input terminal for receiving the command address information ca1 from the physical layer 211. The first TSV circuit 213 may be configured to provide the first command address CA1 to the first memory stack 221 based on the received command address information ca1.

The first TSV circuit 213 may input a data input terminal for receiving the data information dq1 from the stack select circuit 212. The first TSV circuit 213 may be configured to provide the first data DQ1 to the first memory stack 221 based on the received data information dq1.

When the read operation is performed, the first TSV circuit 213 may be configured to receive the first data DQ1 from the first memory stack 221 and to provide the data information dq1 to the stack select circuit 212.

The second TSV circuit 214 may include a command address input terminal for receiving the command address information ca2 from the physical layer 211. The second TSV circuit 214 may be configured to provide the second command address CA2 to the second memory stack 222 based on the received command address information ca2.

The second TSV circuit 214 may include a data input terminal for receiving the data information dq2 from the stack select circuit 212. The second TSV circuit 214 may be configured to provide the second data DQ2 to the second memory stack 222 based on the received data information dq2.

When the read operation is performed, the second TSV circuit 214 may be configured to receive the second data DQ2 from the second memory stack 222 and to provide the data information dq2 to the stack select circuit 212.

Figure 8:
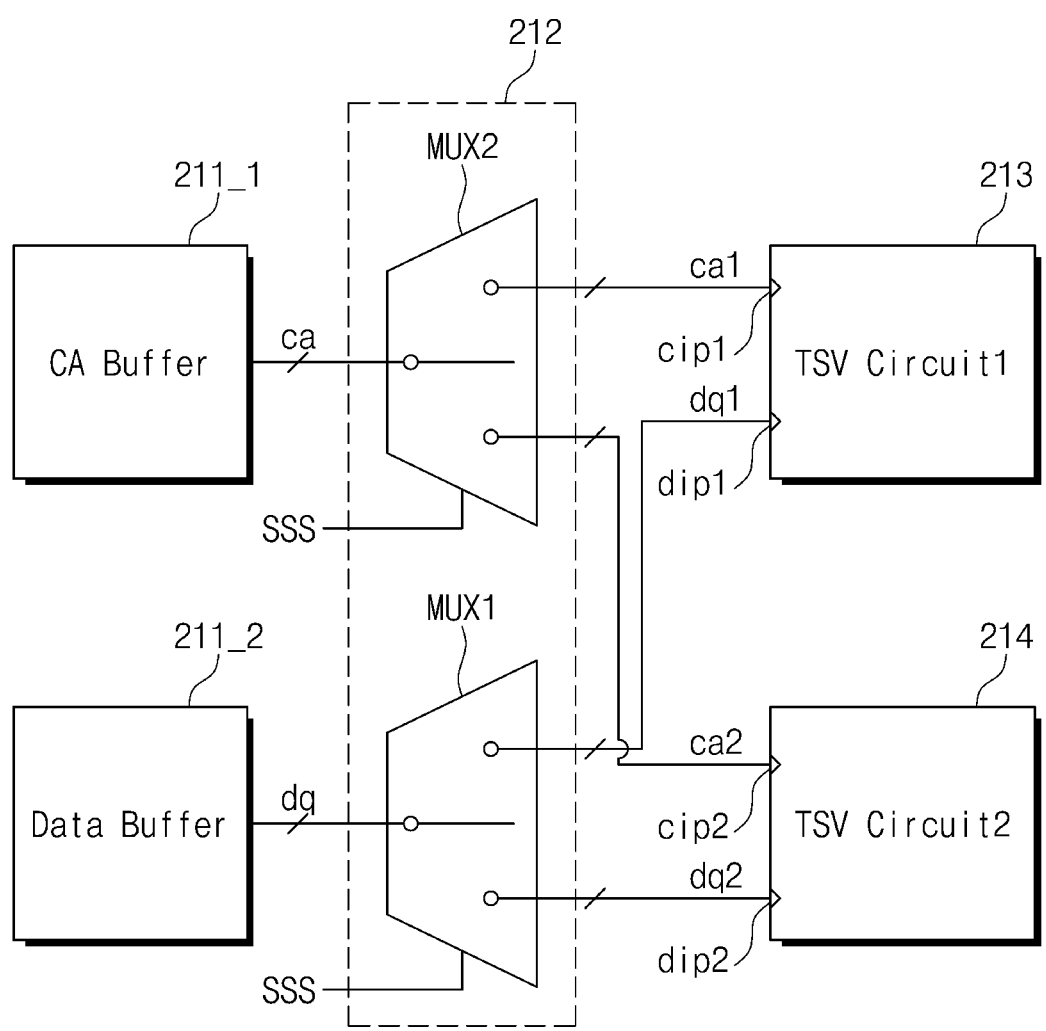
FIG. 8 is a diagram illustrating an example of a stack select circuit of FIG. 7.

FIG. 8 is a diagram illustrating an example of a stack select circuit of FIG. 7. FIGS. 9 and 10 are diagrams for describing an operation of a stack select circuit of FIG. 8. Below, an example of a stack select circuit of FIG. 7 will be described in detail with reference to FIGS. 8 to 10.

Referring to FIG. 8, the stack select circuit 212 may include a first select circuit MUX1 and a second select circuit MUX2.

The first select circuit MUX1 may be configured to receive the stack selection signal SSS. The first select circuit MUX1 may be configured to selectively connect the output terminal of the data buffer 211_2 to the data input terminal dip1 of the first TSV circuit 213 or the data input terminal dip2 of the second TSV circuit 214 based on the stack selection signal SSS.

The second select circuit MUX2 may be configured to receive the stack selection signal SSS. The second select circuit MUX2 may be configured to selectively connect the output terminal of the command address buffer 211_1 with a command address input terminal cip1 of the first TSV circuit 213 or a command address input terminal cip2 of the second TSV circuit 214 based on the stack selection signal SSS.

Figure 9:
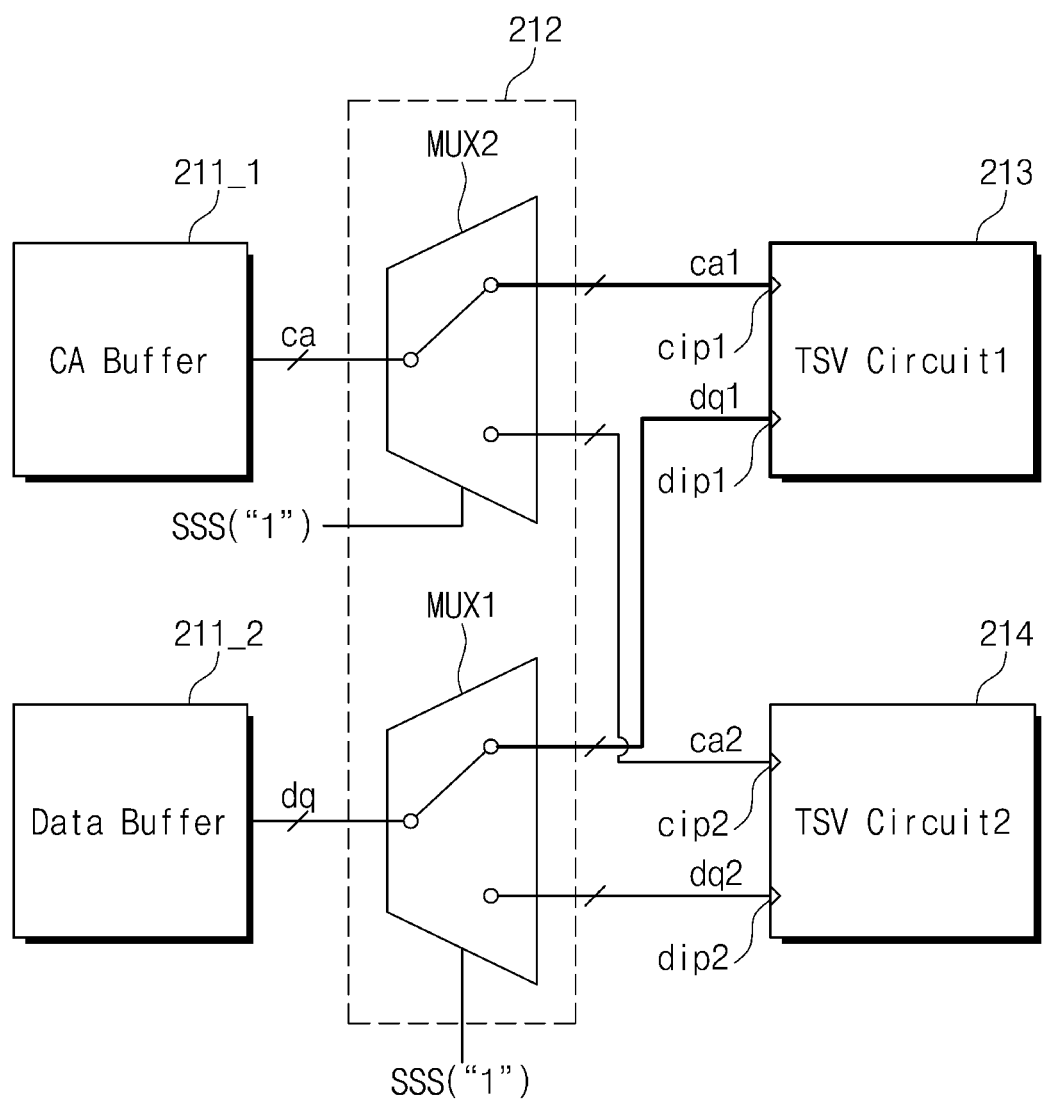
FIGS. 9 and 10 are diagrams for describing an operation of a stack select circuit of FIG. 8.

Referring to FIG. 9, when the stack selection signal SSS is in a first logic state (e.g., a logic "1" state), the second select circuit MUX2 may be configured to electrically connect the output terminal of the command address buffer 211_1 to the command address input terminal cip1 of the first TSV circuit 213, and the first select circuit MUX1 may be configured to electrically connect the output terminal of the data buffer 211_2 to the data input terminal dip1 of the first TSV circuit 213.

When the stack selection signal SSS is in the first logic state, the command address information ca1 stored in the command address buffer 211_1 and the data information dq1 stored in the data buffer 211_2 may be output to the first TSV circuit 213, or the data information dq1 received from the first TSV circuit 213 may be stored in the data buffer 211_2.

Figure 10:
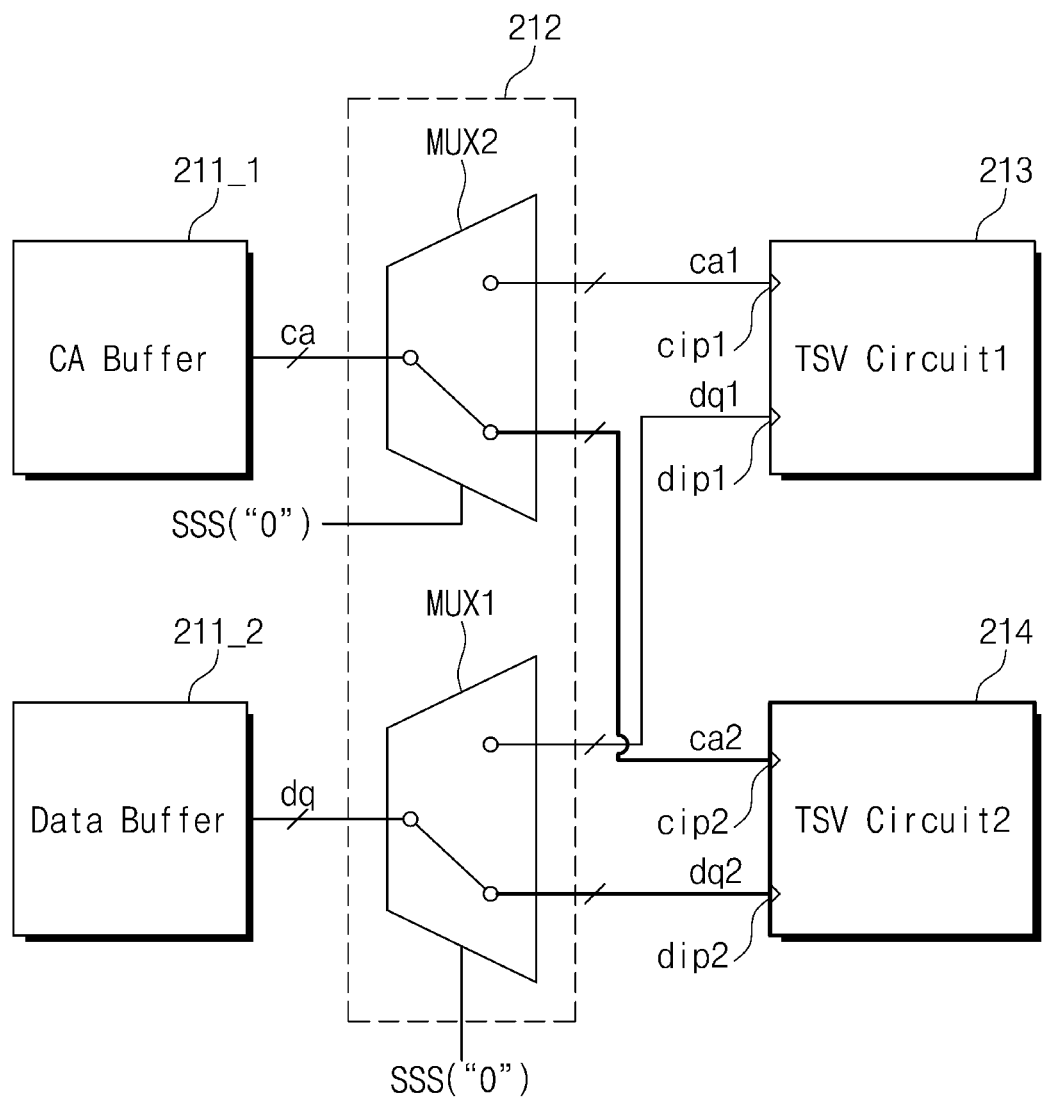

Referring to FIG. 10, when the stack selection signal SSS is in a second logic state (e.g., a logic "0" state), the second select circuit MUX2 may be configured to electrically connect the output terminal of the command address buffer 211_1 to the command address input terminal cip2 of the second TSV circuit 214, and the first select circuit MUX1 may be configured to electrically connect the output terminal of the data buffer 211_2 to the data input terminal dip2 of the second TSV circuit 214.

When the stack selection signal SSS is in the second logic state, the command address information ca2 stored in the command address buffer 211_1 and the data information dq2 stored in the data buffer 211_2 may be output to the second TSV circuit 214, or the data information dq2 received from the second TSV circuit 214 may be stored in the data buffer 211_2.

Figure 11:
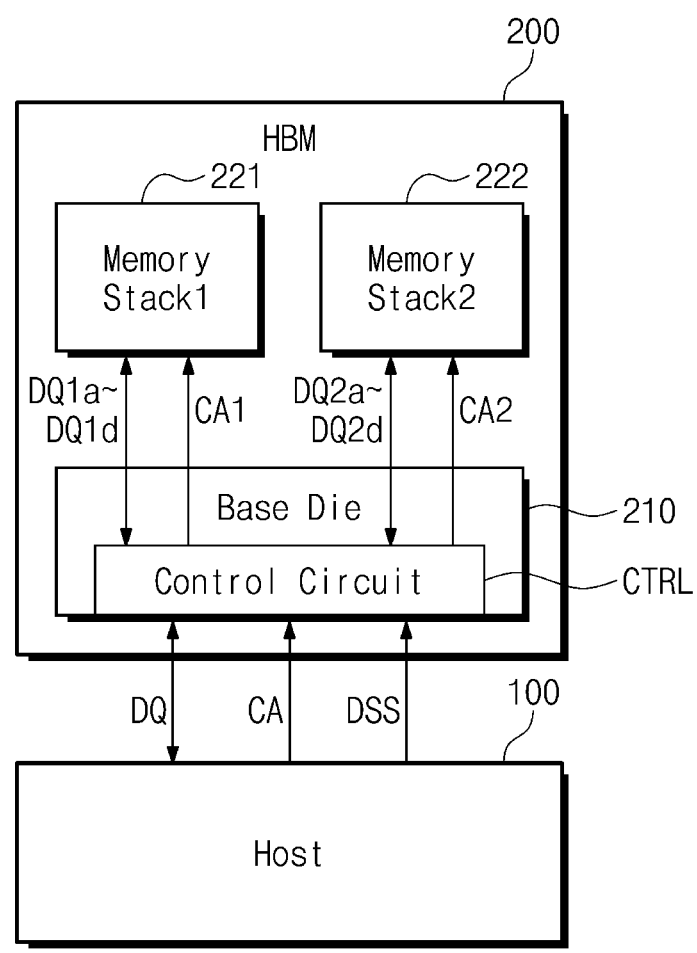
FIG. 11 is a diagram illustrating a memory system according to an embodiment of the present disclosure.

FIG. 11 is a diagram illustrating a memory system according to an embodiment of the present disclosure. Below, the description that is the same as the description given with reference to the embodiment of FIGS. 1 to 6 will be omitted, and the description will be given based on a difference between embodiments.

Referring to FIG. 11, the memory system 10 may include the host 100 and the high-bandwidth memory device 200.

The host 100 may be configured to generate various kinds of signals for controlling a memory operation of the high-bandwidth memory device 200, such as a read operation or a write operation. For example, the host 100 may be configured to generate the command address signal CA including command address information for accessing the high-bandwidth memory device 200, the data signal DQ including data information to be written in the high-bandwidth memory device 200, and a die selection signal DSS for selecting a memory die to be accessed.

The high-bandwidth memory device 200 may include the base die (or logic die or buffer die) 210, the first memory stack 221, and the second memory stack 222.

The control circuit CTRL may be configured to receive the die selection signal DSS. The control circuit CTRL may be configured to provide first data DQ1a to DQ1d to at least one of the first memory dies 221a to 221d of the first memory stack 221 and to provide second data DQ2a to DQ2d to at least one of the second memory dies 222a to 222d of the second memory stack 222, based on the die selection signal DSS. Also, the control circuit CTRL may be configured to read data from at least one of the first memory dies 221a to 221d and at least one of the second memory dies 222a to 222d, based on the die selection signal DSS.

The base die 210 may include under bumps for receiving various kinds of signals from the host 100. The under bumps may include data signal bumps for exchanging the data signal DQ with the host 100 and control signal bumps for receiving the die selection signal DSS.

According to an embodiment of the present disclosure, in the high-bandwidth memory device 200, the first memory dies 221a to 221d of the first memory stack 221 and the second memory dies 222a to 222d of the second memory stack 222 may be configured to perform the memory operation based on the data signal DQ received through the same data signal bumps. In other words, the first memory stack 221 and the second memory stack 222 may share the data signal bumps for receiving the data signal DQ.

Figure 12:
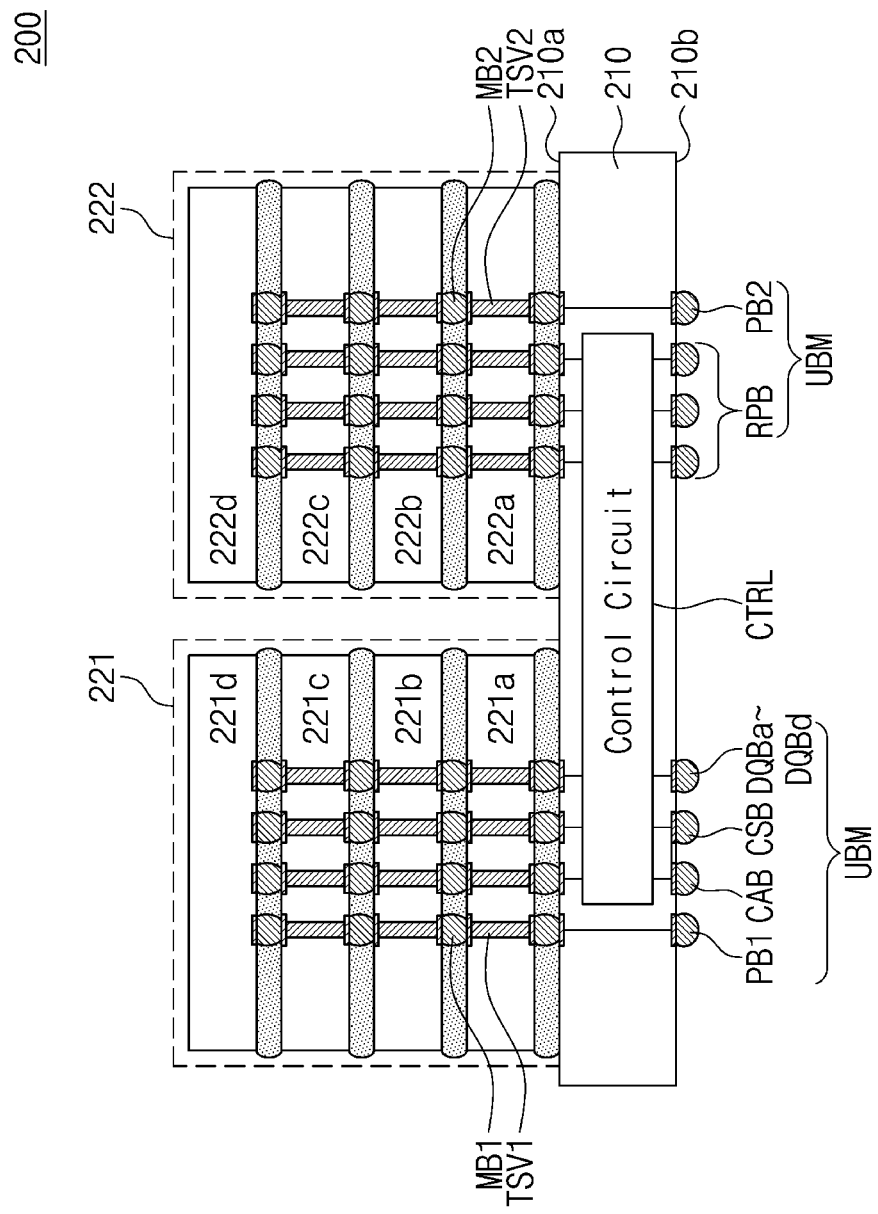
FIG. 12 is a diagram illustrating an embodiment of a high-bandwidth memory device of FIG. 11.

FIG. 12 is a diagram illustrating an embodiment of a high-bandwidth memory device of FIG. 11.

Referring to FIG. 12, the high-bandwidth memory device 200 may include the first memory stack 221, the second memory stack 222, and the base die 210.

Each of the first and second memory stacks 221 and 222 may include a plurality of memory dies. The first memory stack 221 may include the first memory dies 221a to 221d sequentially stacked on the upper surface of the base die 210, and the second memory stack 222 may include the second memory dies 222a to 222d sequentially stacked on the upper surface of the base die 210.

The base die 210 may include the upper surface 210a on which the first memory stack 221 and the second memory stack 222 are provided and the lower surface 210b on which the under bumps UBM for receiving various kinds of signals from the host 100 and transmitting the data signal DQ thereto are provided.

The under bumps UBM provided on the lower surface 210b of the base die 210 may include the power supply bumps PB1 and PB2, the command address bumps CAB, data signal bumps DQBa to DQBd, the residual bumps RPB, and the control signal bumps CSB. The under bumps UBM may be micro bumps.

The data signal bumps DQBa to DQBd may be bumps for transmitting data, which are input to/output from the first memory dies 221a to 221d of the first memory stack 221 and the second memory dies 222a to 222d of the second memory stack 222, to the host 100.

For example, the data signal bumps DQBa to DQBd may include the first data bumps DQBa through which data to be input to or output from the first memory die 221a or the second memory die 222a are transmitted, the second data bumps DQBb through which data to be input to or output from the first memory die 221b or the second memory die 222b are transmitted, the third data bumps DQBc through which data to be input to or output from the first memory die 221c or the second memory die 222c are transmitted, and the fourth data bumps DQBd through which data to be input to or output from the first memory die 221d or the second memory die 222d are transmitted.

According to an embodiment of the present disclosure, the first memory stack 221 and the second memory stack 222 may share the data signal bumps DQBa to DQBd through which the data signal DQ is transmitted. According to the above description, the spare residual bumps RPB may be secured (e.g., reallocated to provide power or other signals) compared to the case where each of the first memory stack 221 and the second memory stack 222 transmits data through independent data signal bumps.

The control signal bumps CSB may be bumps for receiving signals for controlling the control circuit CTRL of the base die 210. For example, the die selection signal DSS may be received from the host 100 through the control signal bumps CSB.

The base die 210 may include the control circuit CTRL configured to provide data information received through the data signal bumps DQBa to DQBd to at least one first memory die and at least one second memory die.

Below, a configuration and an operation of the control circuit CTRL of the base die 210 will be described in detail with reference to FIGS. 13 to 15.

Figure 13:
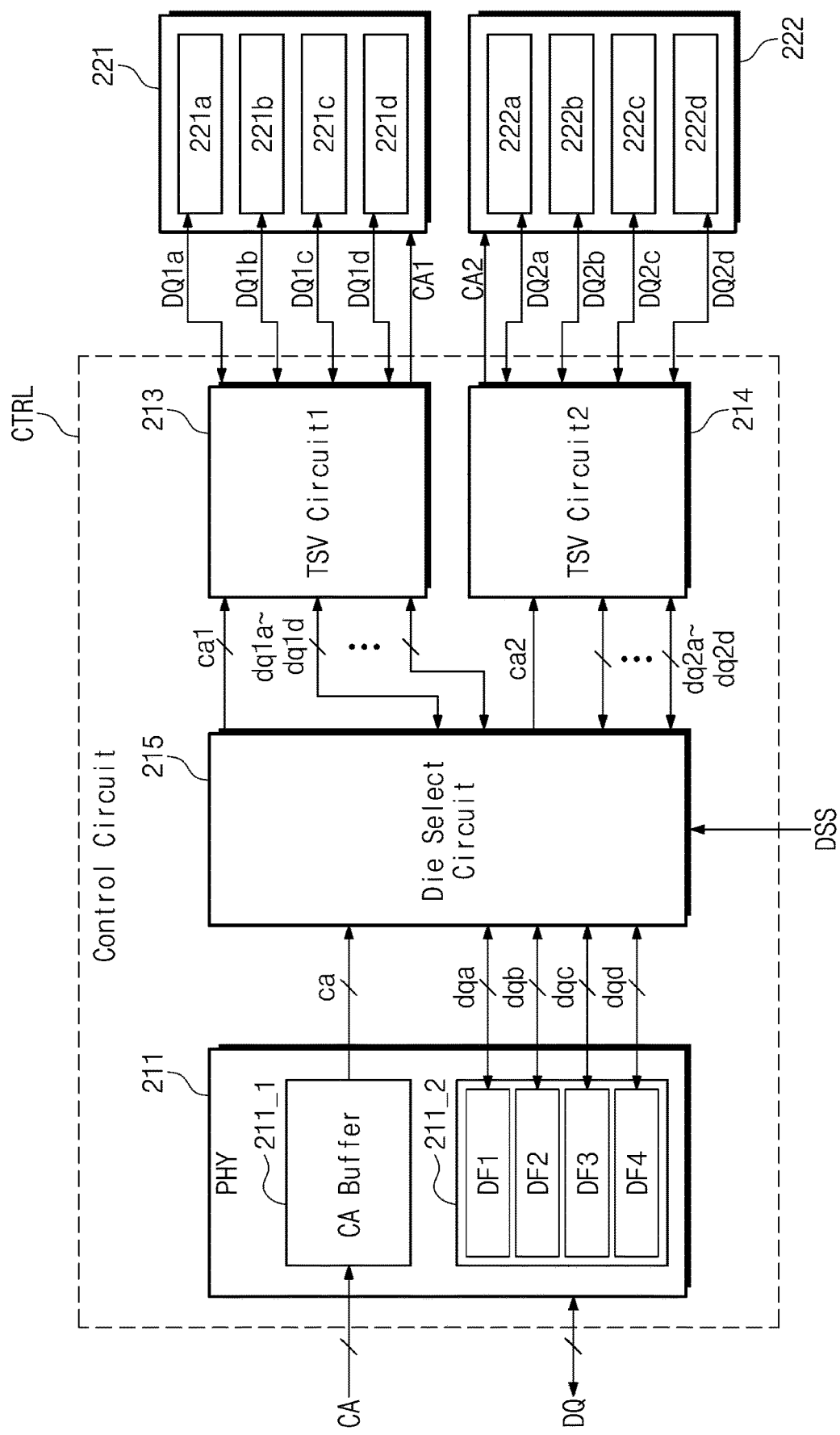
FIG. 13 is a block diagram illustrating components of a control circuit of a base die of FIG. 11.

FIG. 13 is a block diagram illustrating components of a control circuit of a base die of FIG. 11.

Referring to FIG. 13, the control circuit CTRL may include the physical layer 211, a die select circuit 215, the first TSV circuit 213, and the second TSV circuit 214.

The physical layer 211 may include the command address buffer 211_1 and the data buffer 211_2. The physical layer 211 may be configured to store the command address information ca and data information dqa to dqd based on the command address signal CA and the data signal DQ received from the host 100.

The command address buffer 211_1 may be configured to store the command address information ca based on the command address signal CA received through the command address bumps CAB of FIG. 2. The command address buffer 211_1 may be configured to provide the stored command address information ca to the die select circuit 215.

The data buffer 211_2 may include a first data buffer DF1 that stores the first data information dqa received through the first data bumps DQBa, a second data buffer DF2 that stores the second data information dqb received through the second data bumps DQBb, a third data buffer DF3 that stores the third data information dqc received through the third data bumps DQBc, and a fourth data buffer DF4 that stores the fourth data information dqd received through the fourth data bumps DQBd.

The first to fourth data buffers DF1 to DF4 may be configured to store the first to fourth data information dqa to dqd based on the data signal DQ received through the first to fourth data bumps DQBa to DQBd. The first to fourth data buffers DF1 to DF4 may be configured to provide the stored data information dqa to dqd to the die select circuit 215.

The die select circuit 215 may be configured to select at least one of the first memory dies 221a to 221d and at least one of the second memory dies 222a to 222d based on the die selection signal DSS such that the data information and the command address information are output to a TSV circuit connected to the selected memory dies.

The die select circuit 215 may be configured to electrically connect output terminals of the first to fourth data buffers DF1 to DF4 to first to fourth data input terminals of the first TSV circuit 213 or first to fourth data input terminals of the second TSV circuit 214 respectively, based on the die selection signal DSS. A configuration and an operation of the die select circuit 215 will be described in detail with reference to FIGS. 14 and 15.

The first TSV circuit 213 may be electrically connected to the first memory dies 221a to 221d of the first memory stack 221. The die select circuit 215 may provide data information dq1a to dq1d to the first memory dies 221a to 221d through the first TSV circuit 213.

The first TSV circuit 213 may include the first to fourth data input terminals for receiving the data information dq1a to dq1d from the die select circuit 215.

The first data input terminal of the first TSV circuit 213 may be configured to provide the data information dq1a to the first memory die 221a; the second data input terminal of the first TSV circuit 213 may be configured to provide the data information dq1b to the first memory die 221b; the third data input terminal of the first TSV circuit 213 may be configured to provide the data information dq1c to the first memory die 221c; and, the fourth data input terminal of the first TSV circuit 213 may be configured to provide the data information dq1d to the first memory die 221d.

The first TSV circuit 213 may be configured to provide first to fourth memory data DQ1a to DQ1d to the first memory dies 221a to 221d based on the first to fourth data information dq1a to dq1d received from the die select circuit 215.

The first TSV circuit 213 may be configured to provide the first memory data DQ1a to the first memory die 221a based on the first data information dq1a, to provide the second memory data DQ1b to the first memory die 221b based on the second data information dq1b, to provide the third memory data DQ1c to the first memory die 221c based on the third data information dq1c, and to provide the fourth memory data DQ1d to the first memory die 221d based on the fourth data information dq1d.

The second TSV circuit 214 may be electrically connected to the second memory dies 222a to 222d of the second memory stack 222. The die select circuit 215 may provide the data information dq2a to dq2d to the second memory dies 222a to 222d through the second TSV circuit 214.

The second TSV circuit 214 may include the first to fourth data input terminals for receiving the data information dq2a to dq2d from the die select circuit 215.

The first data input terminal of the second TSV circuit 214 may be configured to provide the data information dq2a to the second memory die 222a; the second data input terminal of the second TSV circuit 214 may be configured to provide the data information dq2b to the second memory die 222b; the third data input terminal of the second TSV circuit 214 may be configured to provide the data information dq2c to the second memory die 222c; and, the fourth data input terminal of the second TSV circuit 214 may be configured to provide the data information dq2d to the second memory die 222d.

The second TSV circuit 214 may be configured to generate fifth to eighth memory data DQ2a to DQ2d based on the first to fourth data information dq2a to dq2d received from the die select circuit 215.

The second TSV circuit 214 may be configured to provide the fifth memory data DQ2a to the second memory die 222a based on the first data information dq2a, to provide the sixth memory data DQ2b to the second memory die 222b based on the second data information dq2b, to provide the seventh memory data DQ2c to the second memory die 222c based on the third data information dq2c, and to provide the eighth memory data DQ2d to the second memory die 222d based on the fourth data information dq2d.

Figure 14:
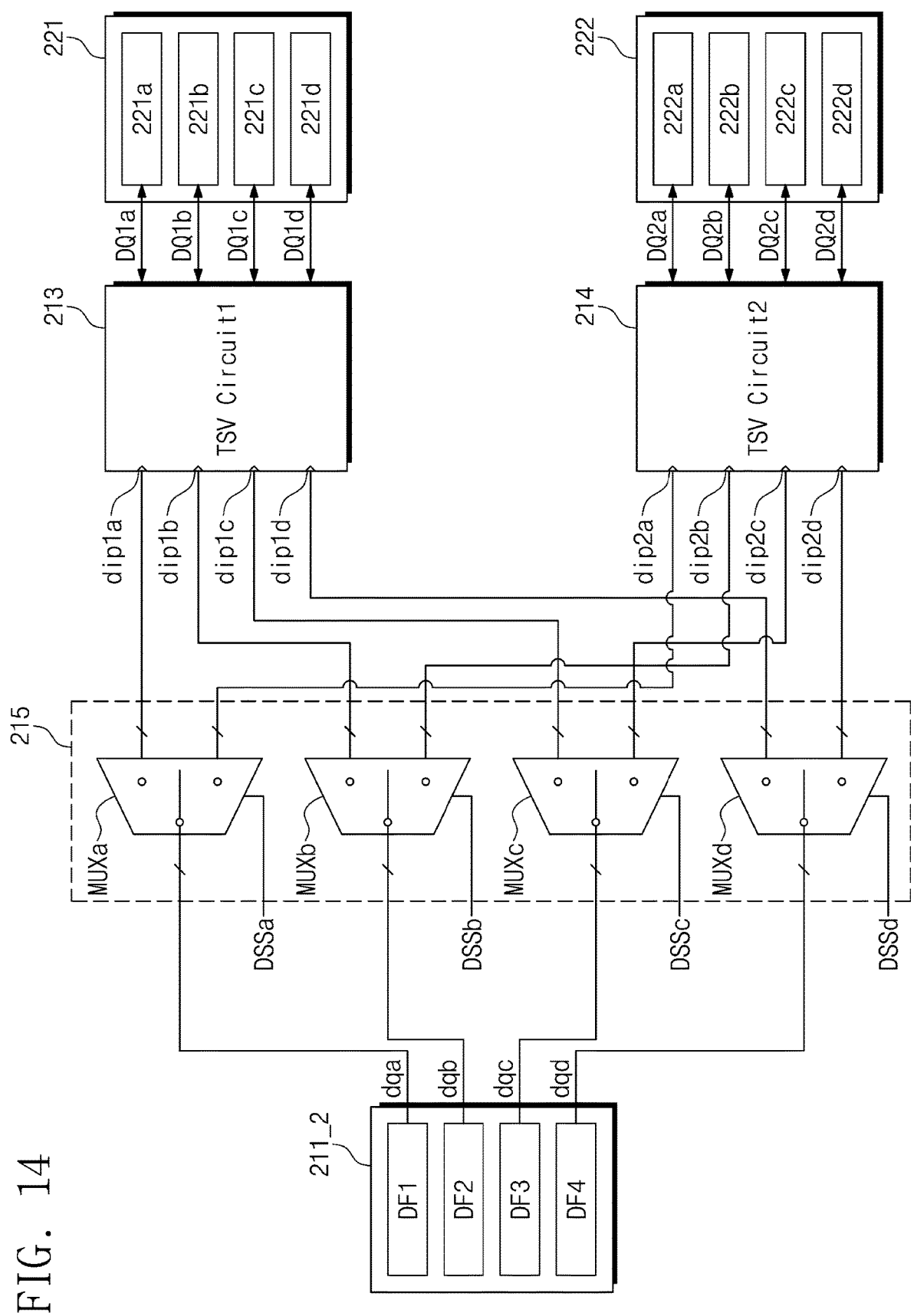
FIG. 14 is a diagram illustrating an example of a die select circuit of FIG. 13.

FIG. 14 is a diagram illustrating an example of a die select circuit of FIG. 13. FIG. 15 is a diagram for describing an operation of a die select circuit of FIG. 14. Below, an example of a die select circuit of FIG. 13 will be described in detail with reference to FIGS. 14 and 15.

Referring to FIG. 14, the die select circuit 215 may include a first memory select circuit MUXa, a second memory select circuit MUXb, a third memory select circuit MUXc, and a fourth memory select circuit MUXd.

The die selection signal DSS may include a first die selection signal DSSa, a second die selection signal DSSb, a third die selection signal DSSc, and a fourth die selection signal DSSd. The first to fourth die selection signals DSSa to DSSd may be independently controlled by the host 100 (refer to FIG. 1).

The first memory select circuit MUXa may be configured to receive the first die selection signal DSSa. The first memory select circuit MUXa may be configured to electrically connect an output terminal of the first data buffer DF1 to a first data input terminal dip1a of the first TSV circuit 213 or a first data input terminal dip2a of the second TSV circuit 214, based on the first die selection signal DSSa.

The second memory select circuit MUXb may be configured to receive the second die selection signal DSSb. The second memory select circuit MUXb may be configured to electrically connect an output terminal of the second data buffer DF2 to a second data input terminal dip1b of the first TSV circuit 213 or a second data input terminal dip2b of the second TSV circuit 214, based on the second die selection signal DSSb.

The third memory select circuit MUXc may be configured to receive the third die selection signal DSSc. The third memory select circuit MUXc may be configured to electrically connect an output terminal of the third data buffer DF3 to a third data input terminal dip1c of the first TSV circuit 213 or a third data input terminal dip2c of the second TSV circuit 214, based on the third die selection signal DSSc.

The fourth memory select circuit MUXd may be configured to receive the fourth die selection signal DSSd. The fourth memory select circuit MUXd may be configured to electrically connect an output terminal of the fourth data buffer DF4 to a fourth data input terminal dip1d of the first TSV circuit 213 or a fourth data input terminal dip2d of the second TSV circuit 214, based on the fourth die selection signal DSSd.

When a die selection signal input to each memory select circuit is in a first logic state (e.g., a logic "1" state), each memory select circuit may be configured to electrically connect an output terminal of a data buffer to a data input terminal of the first TSV circuit 213.

When a die selection signal input to each memory select circuit is in a second logic state (e.g., a logic "0" state), each memory select circuit may be configured to electrically connect an output terminal of a data buffer to a data input terminal of the second TSV circuit 214.

Figure 15:
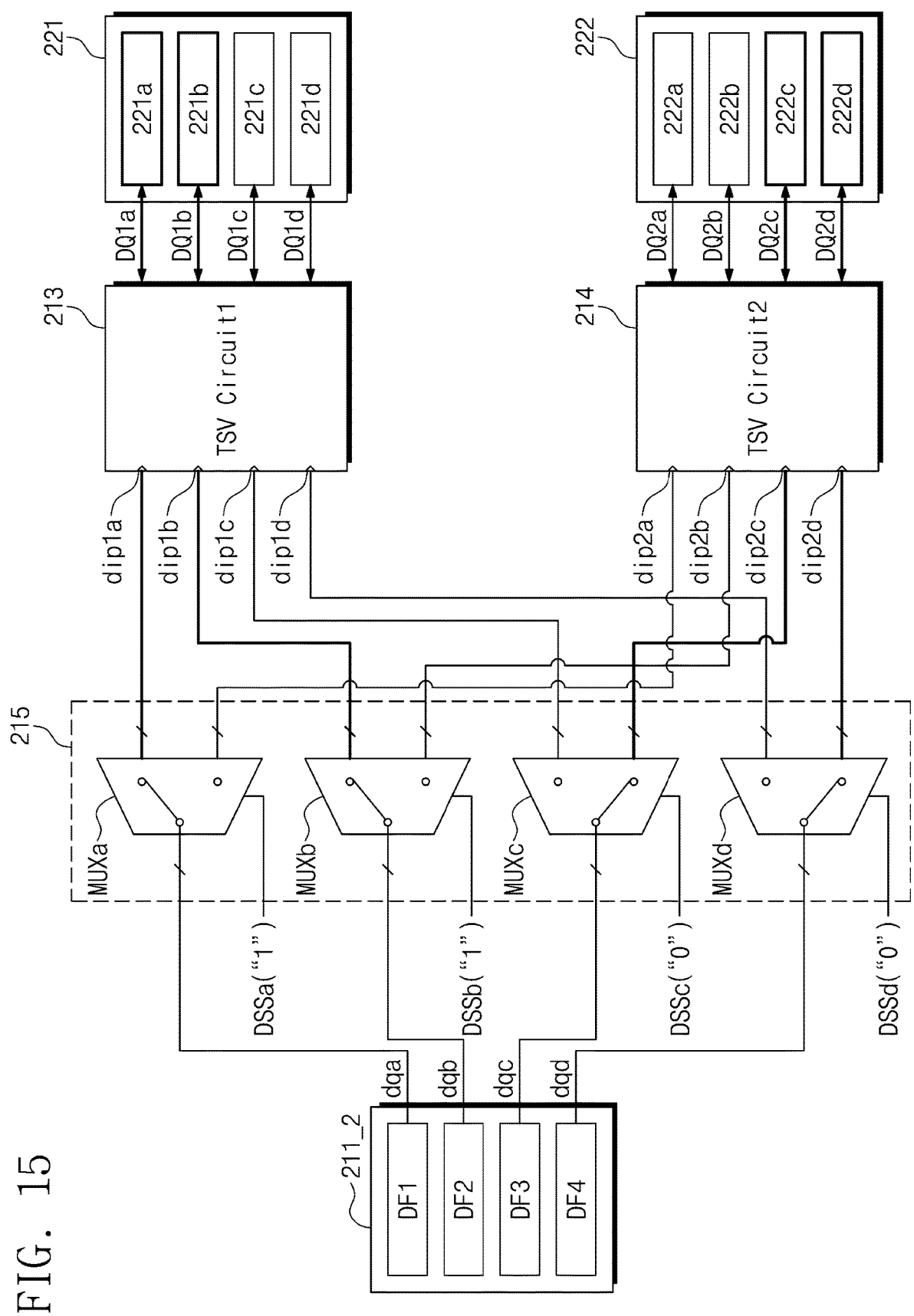
FIG. 15 is a diagram for describing an operation of a die select circuit of FIG. 14.

As illustrated in FIG. 15, when the first die selection signal DSSa and the second die selection signal DSSb are in the first logic state and the third die selection signal DSSc and the fourth die selection signal DSSd are in the second logic state, the first data information dqa stored in the first data buffer DF1 and the second data information dqb stored in the second data buffer DF2 may be provided to the first TSV circuit 213, and the third data information dqc stored in the third data buffer DF3 and the fourth data information dqd stored in the fourth data buffer DF4 may be provided to the second TSV circuit 214. As such, the first TSV circuit 213 may generate the first memory data DQ1a and the second memory data DQ1b so as to be provided to the first memory dies 221a and 221b, and the second TSV circuit 214 may generate the seventh memory data DQ2c and the eighth memory data DQ2d so as to be provided to the second memory dies 222c and 222d.

According to an embodiment of the present disclosure, the data information dqa to dqd that are input to/output from the first memory dies 221a to 221d and the second memory dies 222a to 222d may be transferred through the same common data signal bumps DQBa to DQBd provided on the lower surface 210b of the base die 210. According to an embodiment of the present disclosure, it may be possible to secure the spare residual bumps RPB compared to the case where the first memory dies 221a to 221d and the second memory dies 222a to 222d transmit data through independent data signal bumps; in this case, the power characteristic of the high-bandwidth memory device 200 may be improved by providing the power to the spare residual bumps RPB.

Figure 16:
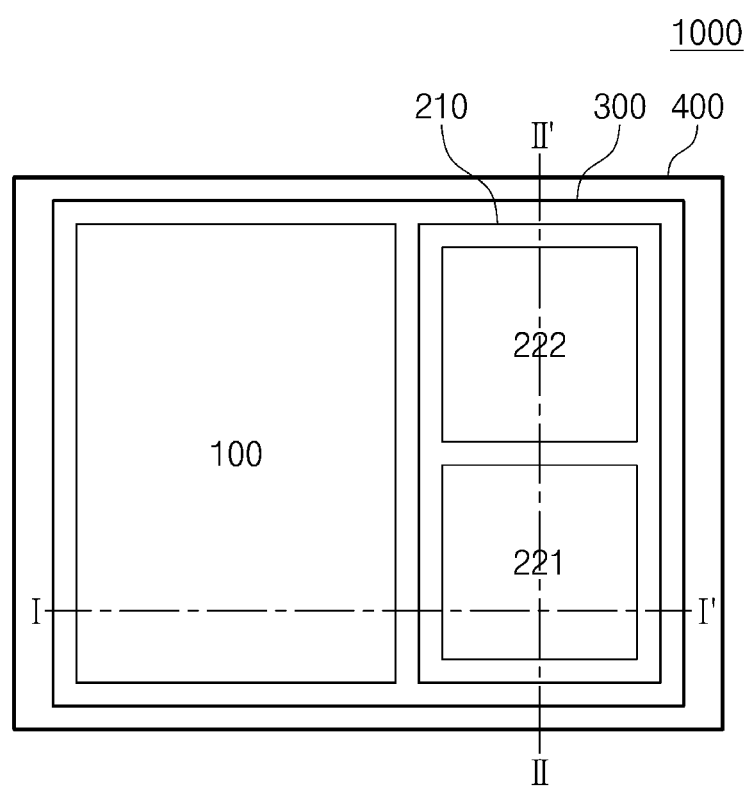
FIG. 16 is a diagram illustrating a memory system device according to an embodiment of the present disclosure.
Figure 17:
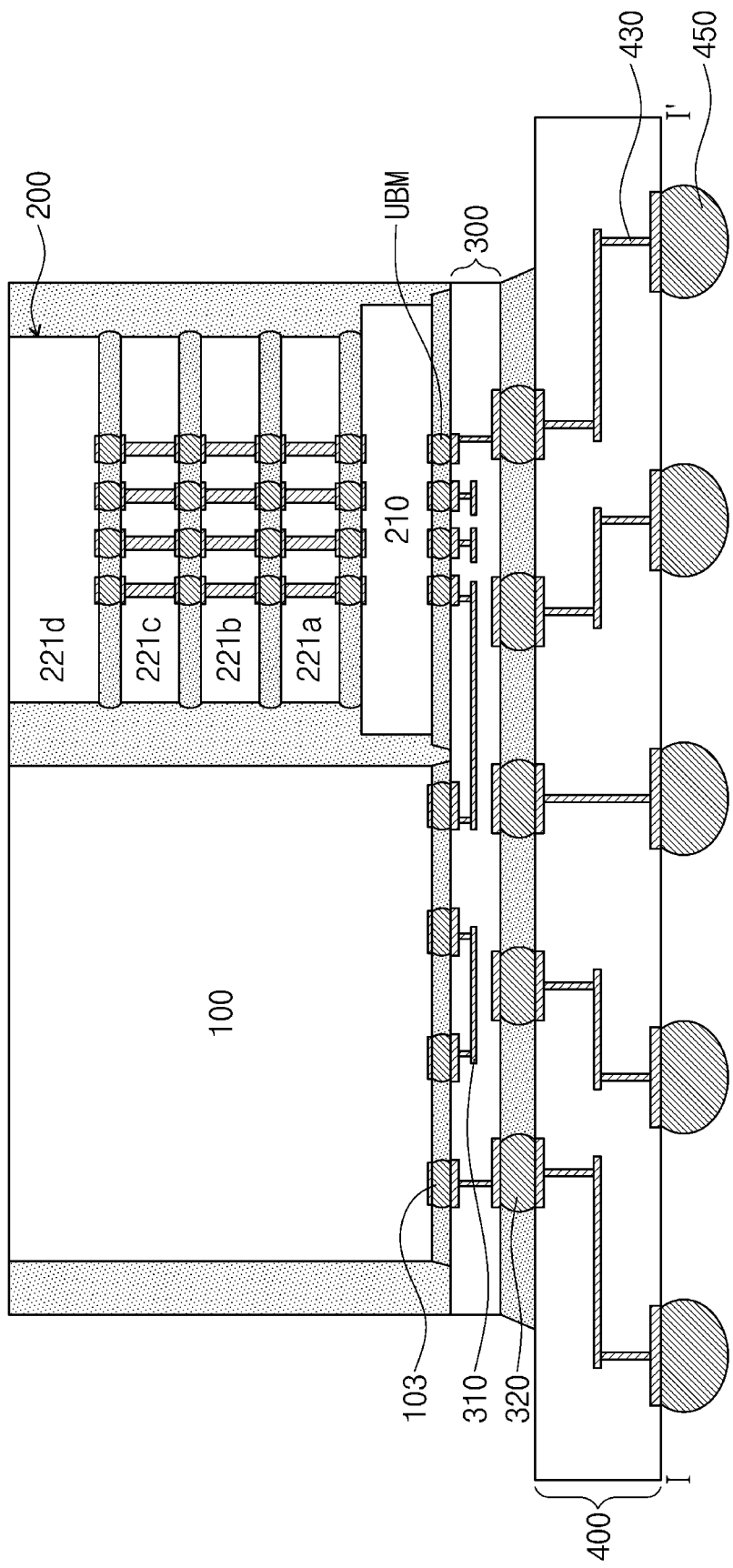
FIG. 17 is a cross-sectional view of a memory system device taken along line I-I' of FIG. 16.
Figure 18:
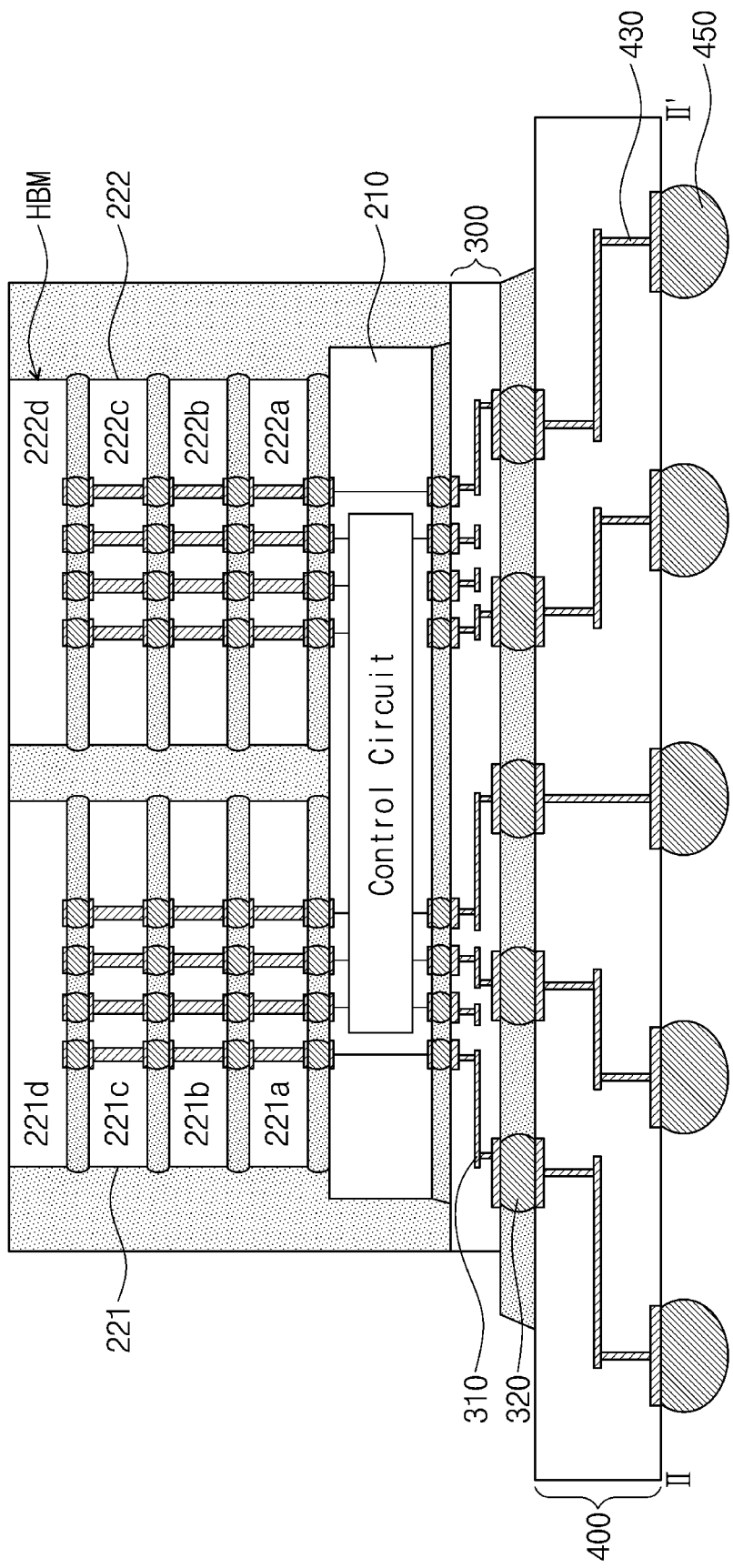
FIG. 18 is a cross-sectional view of a memory system device taken along line II-II' of FIG. 16.

FIG. 16 is a diagram illustrating a memory system device according to an embodiment of the present disclosure. FIG. 17 is a cross-sectional view of a memory system device taken along line I-I' of FIG. 16. FIG. 18 is a cross-sectional view of a memory system device taken along line II-II' of FIG. 16.

Referring to FIGS. 16 to 18, a memory system device according to an embodiment of the present disclosure may be a system device manufactured in the form of a two-and-a-half dimensional (2.5D) package.

A memory system device 1000 may include the high-bandwidth memory device 200, a control device 100, an interposer 300, and a printed circuit board (PCB) 400. The high-bandwidth memory device 200 and the control device 100 may be mounted on the interposer 300.

The high-bandwidth memory device 200 may include the embodiments described with reference to FIGS. 1 to 15.

The control device 100 may include a graphic processing unit (GPU) die, a central processing unit (CPU) die, or a system on chip (SoC).

The control device 100 may be configured to generate the command address signal CA including command address information for accessing the high-bandwidth memory device 200, the data signal DQ including data information, the stack selection signal SSS for selecting a memory die to be accessed, and the die selection signal DSS for selecting memory dies to be accessed.

Control device bumps 103 may be provided on the lower surface of the control device 100. The Control device bumps 103 may include control device command address bumps and control signal data signal bumps. The control device 100 may be configured to output the command address signal CA and the data signal DQ to the high-bandwidth memory device 200 through the Control device bumps 103.

The interposer 300 may include conductive lines 310 that connect the Control device bumps 103 and under bumps. For example, the interposer 300 may include command address lines that connect the control device command address bumps and the command address bumps and data lines that connect the control device data signal bumps and the data signal bumps.

The interposer 300 may further include power lines that connect the power supply bumps and the Control device bumps 103.

Interposer bumps 320 may be disposed on the lower surface of the interposer 300. The interposer bumps 320 may include power bumps and control signal and data signal bumps.

Solder balls 450 may be disposed on the lower surface of the printed circuit board 400. The solder balls 450 may include power balls and control signal and data balls. Through wiring lines 430 of the printed circuit board 400, the power bumps and the power balls may be connected, and the control signal and data signal bumps and the control signal and data balls may be connected.

According to an embodiment of the present disclosure, a memory device whose electrical characteristic is improved is provided.

While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A memory device comprising:
   a base die including a data signal bump configured to receive a data signal, the base die configured to receive a stack selection signal;
   a first memory stack including first memory dies sequentially stacked on the base die; and
   a second memory stack including second memory dies sequentially stacked on the base die and spaced from the first memory stack in a direction parallel to an upper surface of the base die,
   wherein the base die is configured to selectively provide the data signal received through the data signal bump to one of the first memory stack or the second memory stack based on the stack selection signal.

2. The memory device of claim 1, wherein the base die includes a command address bump configured to receive a command address signal, and the base die is configured to access the one of the first memory stack or the second memory stack responsive to receiving the command address signal.

3. The memory device of claim 1, wherein the base die further includes:
   a first power supply bump configured to supply power to the first memory stack;
   a second power supply bump configured to supply power to the second memory stack; and
   a residual bump configured to supply power to the base die, the first memory stack, and the second memory stack.

4. The memory device of claim 1, wherein the base die further includes:
   a control signal bump configured to receive the stack selection signal.

5. The memory device of claim 4, wherein the base die further includes:
   a data buffer configured to store data information based on the data signal;
   a stack select circuit configured to receive the data information stored in the data buffer and the stack selection signal;
   a first through silicon via (TSV) circuit electrically connected to the first memory stack; and
   a second TSV circuit electrically connected to the second memory stack, and
   wherein the stack select circuit is configured to:
   select one memory stack among the first memory stack and the second memory stack based on the stack selection signal; and
   provide the data information to the one memory stack that was selected through a corresponding TSV circuit among the first and second TSV circuits, wherein the corresponding TSV circuit is connected to the one memory stack that was selected.

6. The memory device of claim 5, wherein, when the stack selection signal has a first logic state, the stack select circuit is configured to electrically connect an output terminal of the data buffer and a data input terminal of the first TSV circuit, and
   wherein, when the stack selection signal has a second logic state, the stack select circuit is configured to electrically connect the output terminal of the data buffer and a data input terminal of the second TSV circuit.

7. The memory device of claim 6, wherein the first TSV circuit is configured to provide first data to the first memory stack based on the data information received from the stack select circuit, and
   wherein the second TSV circuit is configured to provide second data to the second memory stack based on the data information received from the stack select circuit.

8. The memory device of claim 5, wherein the stack select circuit includes a first select circuit configured to receive the stack selection signal, and
   wherein the first select circuit is configured to:
   when the stack selection signal has a first logic state, electrically connect an output terminal of the data buffer and a data input terminal of the first TSV circuit, and
   when the stack selection signal has a second logic state, electrically connect the output terminal of the data buffer and a data input terminal of the second TSV circuit.

9. The memory device of claim 1, wherein the base die further includes:
   a command address bump configured to receive a command address signal including command address information, and
   wherein the base die is configured to selectively provide the command address signal received through the command address bump to the one of the first memory stack or the second memory stack.

10. The memory device of claim 9, wherein the base die further includes:
    a first power supply bump configured to supply power to the first memory stack;
    a second power supply bump configured to supply power to the second memory stack; and
    a residual bump configured to supply power to the base die, the first memory stack, and the second memory stack.

11. The memory device of claim 9, wherein the base die further includes:
    a control signal bump configured to receive the stack selection signal, and
    wherein the base die is configured to selectively provide the data signal and the command address signal to the one of the first memory stack or the second memory stack based on the stack selection signal.

12. The memory device of claim 11, wherein the base die further includes:
    a data buffer configured to store data information based on the data signal;
    a command address buffer configured to store the command address information based on the command address signal;
    a stack select circuit configured to receive the data information stored in the data buffer, the command address signal stored in the command address buffer, and the stack selection signal;
    a first TSV circuit electrically connected to the first memory stack; and a second TSV circuit electrically connected to the second memory stack, and wherein the stack select circuit is configured to:

select one memory stack among the first memory stack and the second memory stack based on the stack selection signal; and provide the data information and the command address information to the one memory stack that was selected through a corresponding TSV circuit among the first and second TSV circuits, wherein the corresponding TSV circuit is connected to the one memory stack that was selected.

13. The memory device of claim 12, wherein the stack select circuit includes a first select circuit and a second select circuit each configured to receive the stack selection signal, and wherein the first select circuit is configured to:

when the stack selection signal has a first logic state, electrically connect an output terminal of the data buffer to a data input terminal of the first TSV circuit; and when the stack selection signal has a second logic state, electrically connect the output terminal of the data buffer to a data input terminal of the second TSV circuit, wherein the second select circuit is configured to:

when the stack selection signal has the first logic state, electrically connect an output terminal of the command address buffer to a command address input terminal of the first TSV circuit; and when the stack selection signal has the second logic state, electrically connect the output terminal of the command address buffer to a command address input terminal of the second TSV circuit.

14. A memory device comprising:

a base die including a data signal bump configured to receive a data signal;

a first memory stack including first memory dies sequentially stacked on the base die; and a second memory stack including second memory dies sequentially stacked on the base die and spaced from the first memory stack in a direction parallel to an upper surface of the base die, wherein the base die is configured to select one memory stack among the first memory stack and the second memory stack based on at least one selection signal and provide the data signal received through the data signal bump to at least one of the first memory dies and at least one of the second memory dies based on the at least one selection signal.

15. The memory device of claim 14, wherein the base die further includes:

a first power supply bump configured to supply power to the first memory stack;

a second power supply bump configured to supply power to the second memory stack; and a residual bump configured to supply power to the base die, the first memory stack, and the second memory stack.

16. The memory device of claim 14, wherein the base die further includes:

a control signal bump configured to receive a die selection signal as the at least one selection signal, and wherein the base die is configured to provide the data signal to the at least one of the first memory dies and the at least one of the second memory dies based on the die selection signal.

17. The memory device of claim 16, wherein the base die further includes:

a data buffer configured to store data information based on the data signal;

a die select circuit configured to receive the data information stored in the data buffer and the die selection signal;

a first TSV circuit electrically connected to the at least one of the first memory dies; and a second TSV circuit electrically connected to the at least one of the second memory dies, wherein the die select circuit is configured to:

select a memory die among the at least one of the first memory dies and the at least one of the second memory dies based on the die selection signal; and provide the data signal to the memory die that was selected through a TSV circuit among the first and second TSV circuits, wherein the TSV circuit is electrically connected to the memory die that was selected.

18. The memory device of claim 17, wherein the die select circuit includes a first memory select circuit configured to receive the die selection signal, and wherein the first memory select circuit is configured to selectively connect an output terminal of the data buffer to a data input terminal of the first TSV circuit or a data input terminal of the second TSV circuit, based on the die selection signal.

19. A system device comprising:

an interposer;

a memory device on the interposer; and a control device on the interposer, and configured to generate a data signal including data information, wherein the memory device includes:

a base die including a data signal bump configured to receive the data signal from the control device through the interposer;

a first memory stack including first memory dies sequentially stacked on the base die; and a second memory stack including second memory dies sequentially stacked on the base die and spaced from the first memory stack in a direction parallel to an upper surface of the base die, wherein the base die is configured to selectively provide the data signal received through the data signal bump to one of the first memory stack or the second memory stack based on a selection signal.

20. The system device of claim 19, wherein the control device includes a graphic processing unit (GPU) die, a central processing unit (CPU) die, or a system on chip (SoC).

* * * * *